(12) United States Patent
Kaiser et al.

(10) Patent No.: US 9,106,119 B2
(45) Date of Patent: Aug. 11, 2015

(54) SUPPORT RING FOR ELECTRIC MACHINE ROTORS

(75) Inventors: Edward L. Kaiser, Orion, MI (US); Micah Joel Fuchs, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 615 days.

(21) Appl. No.: 13/331,361

(22) Filed: Dec. 20, 2011

(65) Prior Publication Data

US 2013/0154437 A1  Jun. 20, 2013

(51) Int. Cl.
*H02K 1/22* (2006.01)
*H02K 1/24* (2006.01)
*H02K 1/30* (2006.01)
*H02K 3/52* (2006.01)

(52) U.S. Cl.
CPC .................. *H02K 3/527* (2013.01); *H02K 1/24* (2013.01); *H02K 1/30* (2013.01); *H02K 2203/12* (2013.01)

(58) Field of Classification Search
CPC ......... H02K 3/51; H02K 3/527; H02K 3/528; H02K 55/04
USPC .......... 310/216.114, 216.121, 260, 263, 270, 310/400
See application file for complete search history.

(56) References Cited

U.S. PATENT DOCUMENTS

| 3,728,566 | A   | * | 4/1973  | Costello ........................ 310/194 |
| 3,797,106 | A   | * | 3/1974  | Costello ......................... 29/598 |
| 6,465,928 | B1  | * | 10/2002 | Shervington et al. ......... 310/270 |
| 6,753,637 | B2  | * | 6/2004  | Tornquist et al. .......... 310/261.1 |
| 7,015,617 | B2  | * | 3/2006  | Tornquist et al. ...... 310/216.121 |
| 2003/0137208 | A1 | * | 7/2003  | York et al. .................... 310/194 |
| 2008/0169722 | A1 |   | 7/2008  | Ho |

* cited by examiner

*Primary Examiner* — Naishadh Desai
(74) *Attorney, Agent, or Firm* — Quinn Law Group, PLLC

(57) ABSTRACT

A support ring for a rotor having a core and a plurality of windings. The support ring includes an annular base, a plurality of fingers, and a plurality of loaded edges. The plurality of fingers extend radially outward from the annular base, and each generally corresponds to one of the windings. The plurality of loaded edges extend axially from the fingers and are disposed radially outward of the windings.

11 Claims, 6 Drawing Sheets

SUPPORT RING FOR ELECTRIC MACHINE ROTORS

TECHNICAL FIELD

This disclosure relates to wound rotors used in electric machines.

BACKGROUND

A stator is the stationary part of an electric machine. The stator interacts with a rotor, which is the moving or rotating part of the electric machine. The stator and rotor allow the electric machine to convert mechanical energy to electrical energy (generator mode) and to convert electrical energy to mechanical energy (motor mode).

SUMMARY

A support ring for a rotor, such as those used in electric machines, is provided. The rotor has a core and a plurality of windings. The support ring includes an annular base, a plurality of fingers, and a plurality of loaded edges. The plurality of fingers extend radially outward from the annular base, and each of the fingers generally corresponds to one of the windings. The plurality of loaded edges extend axially from the fingers and are disposed radially outward of the windings.

A rotor is also provided, and includes a hub, a core, and plurality of windings. The core is disposed radially outward of the hub, relative to an axis of the rotor, and has a plurality of rotor teeth extending axially outward. The plurality of windings are wrapped around the rotor teeth.

The rotor also includes a first support ring and a second support ring. The first support ring has a first disc, and a plurality of first fingers extending radially outward, and a plurality of first loaded edges extending axially from the first fingers. The second support ring has a second disc, a plurality of second fingers extending radially outward from the second disc, and a plurality of second loaded edges extending axially from the second fingers.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
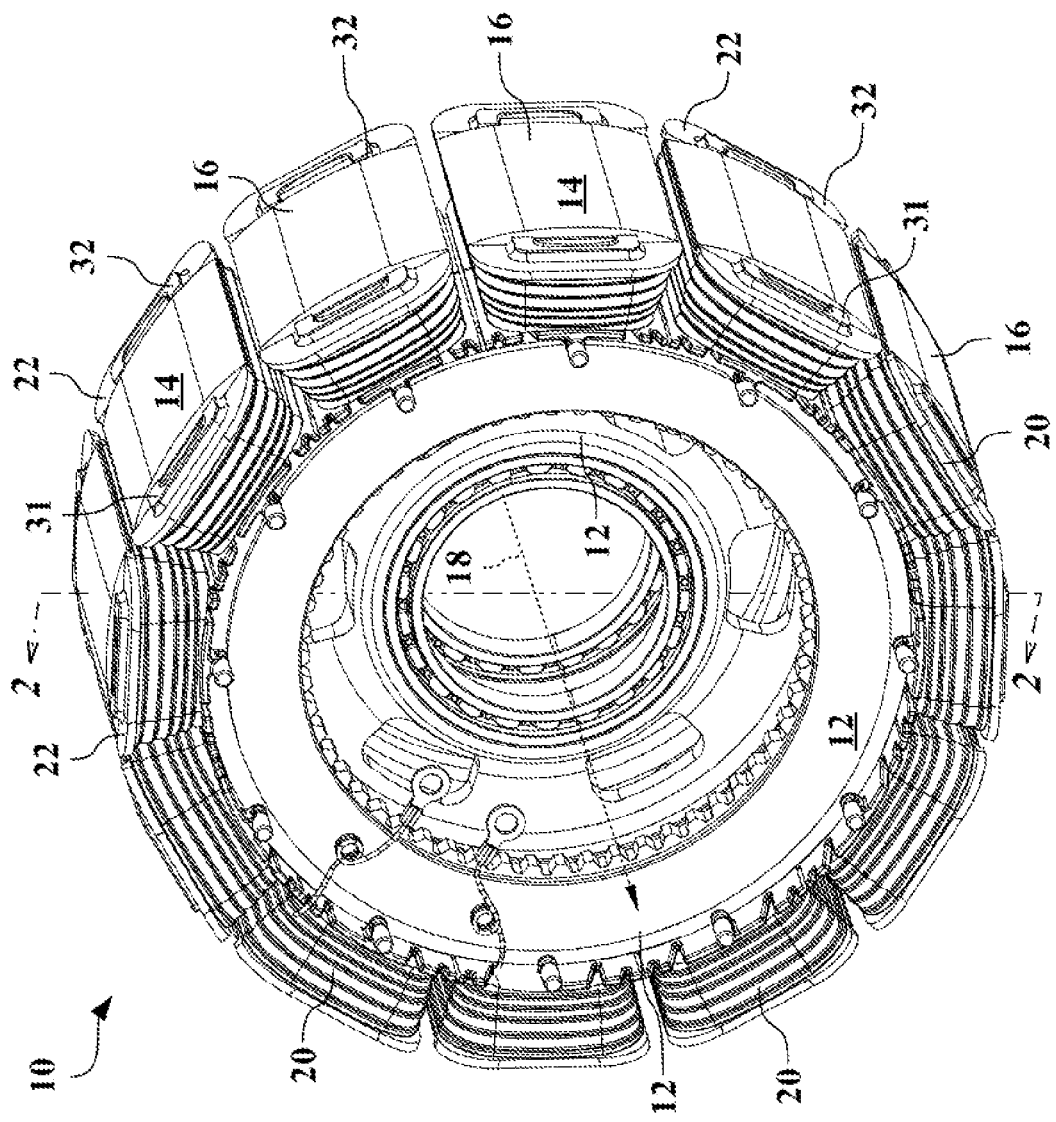
FIG. 1 is a schematic, isometric view of a wound rotor.
Figure 2:
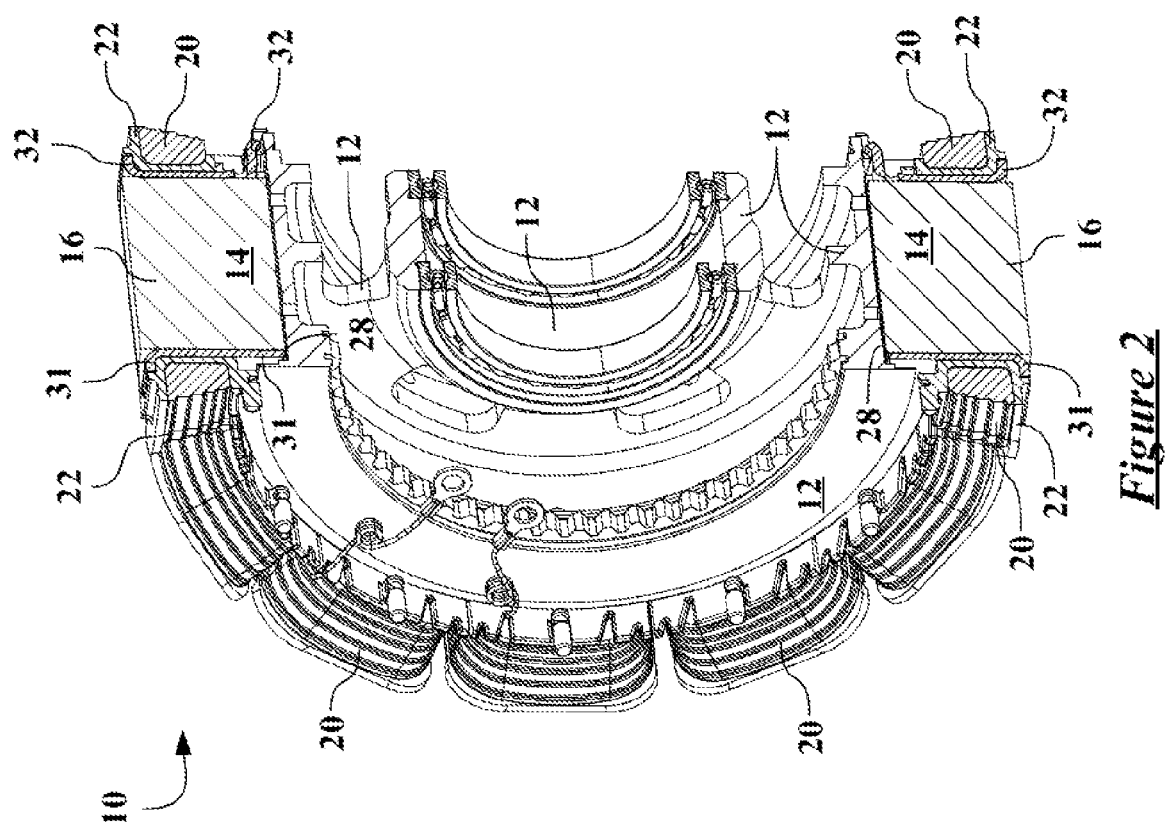
FIG. 2 is a schematic, cross-sectional view of the rotor shown in FIG. 1 taken along line 2-2.

Referring to the drawings, wherein like reference numbers correspond to like or similar components whenever possible throughout the several figures, there are shown in FIG. 1 and FIG. 2 two schematic views of a rotor 10, which may be used in an electric machine (not shown). The rotor 10 shown in FIGS. 1 and 2 is an internal, wound rotor, which cooperates with an external stator (not shown) in the electric machine.

FIG. 1 shows an isometric view of the rotor 10, substantially assembled.

FIG. 2 shows a cross section of the rotor 10, taken along line 2-2 of FIG. 1. Features and components shown in other figures may be incorporated and used with those shown in FIG. 1 and FIG. 2, and components may be mixed and matched between any of the configurations shown.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The rotor 10 includes a hub 12 and a core 14, which has a plurality of rotor teeth 16. The core 14 is disposed radially outward of the hub 12, relative to an axis 18 of the rotor 10. The core 14 shown is formed as a solid, one-piece core, but may alternatively be formed as a segmented core or as a laminated (axially-layered) core, and may be formed of powdered metal, cast, or machined.

The rotor 10 rotates about the axis 18 during operation of the electric machine. The stator of the electric machine would share substantially the same axis 18. For cylindrical coordinates, in addition to the axis 18, the rotor 10 also defines a radial direction, which extends perpendicularly outward from the axis 18, and an angular axis or a tangential axis, which is in the direction of rotation about the radial direction. The rotor 10 may also use Cartesian coordinates, with the axis 18 being the z-axis, and also defining an x-axis (not shown) and a y-axis (not shown), both of which are perpendicular to the axis 18.

The rotor 10 includes a plurality of windings 20 that are wrapped around the rotor teeth 16, and extend axially beyond the core. The windings 20 are shown as a single block of material, but may be formed from wires or bar conductors that are then looped or twisted around the rotor teeth 16.

Figure 3:
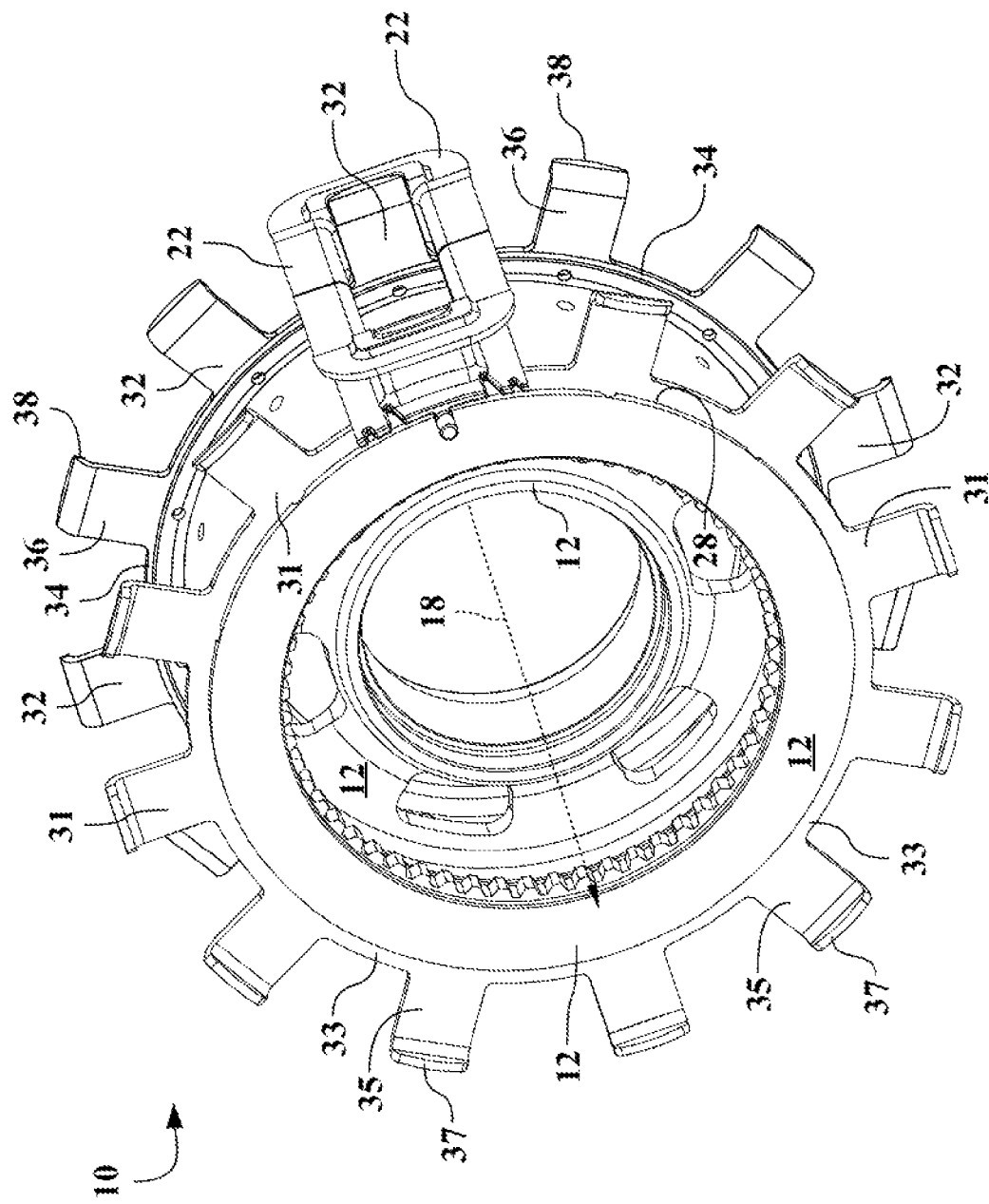
FIG. 3 is a schematic, isometric view of the rotor shown in FIG. 1, shown with a core hidden from view to better illustrate a first support ring and a second support ring.
Figure 4:
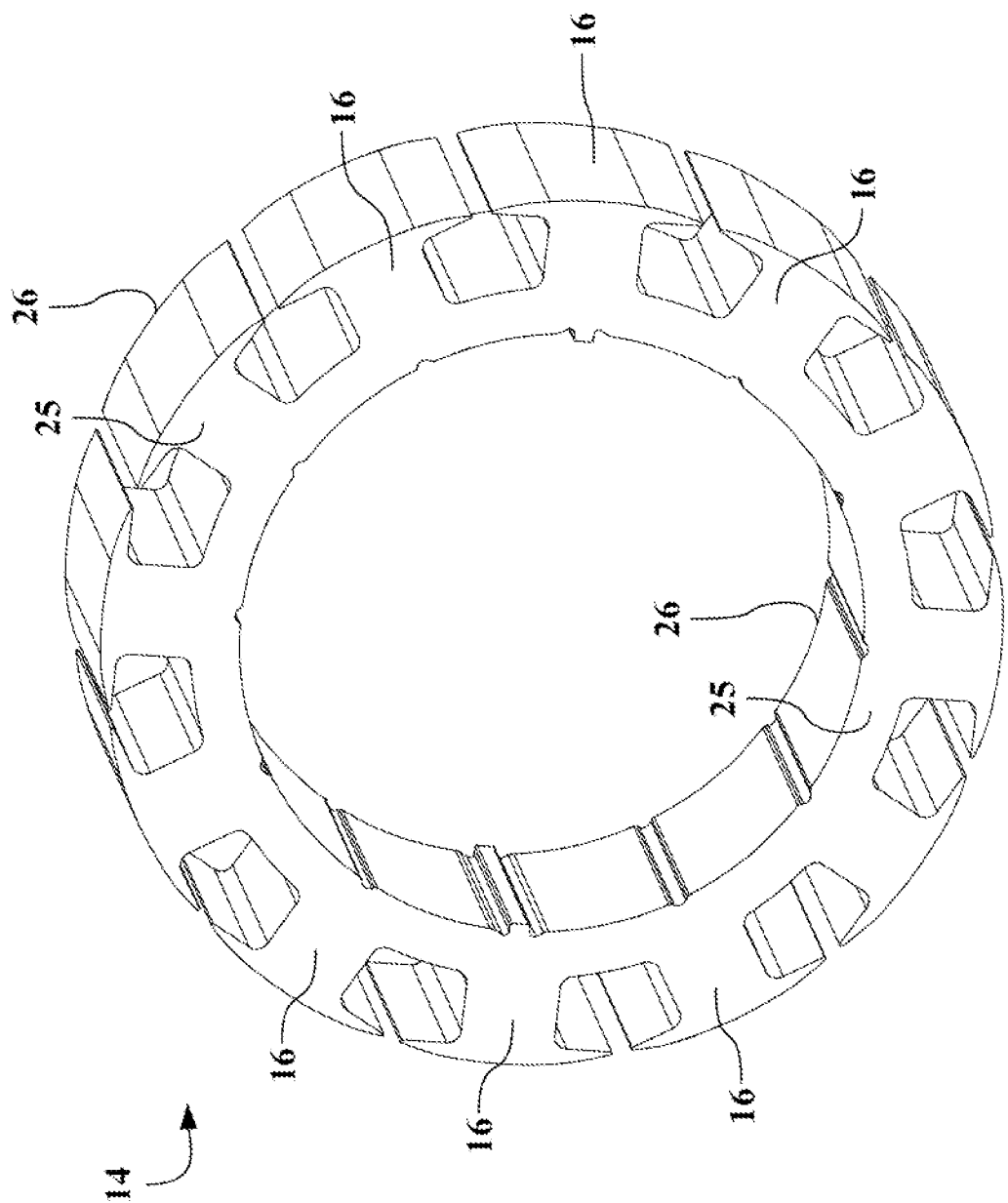
FIG. 4 is a schematic, isometric view of the core of the rotor shown in FIG. 1.
Figure 5:
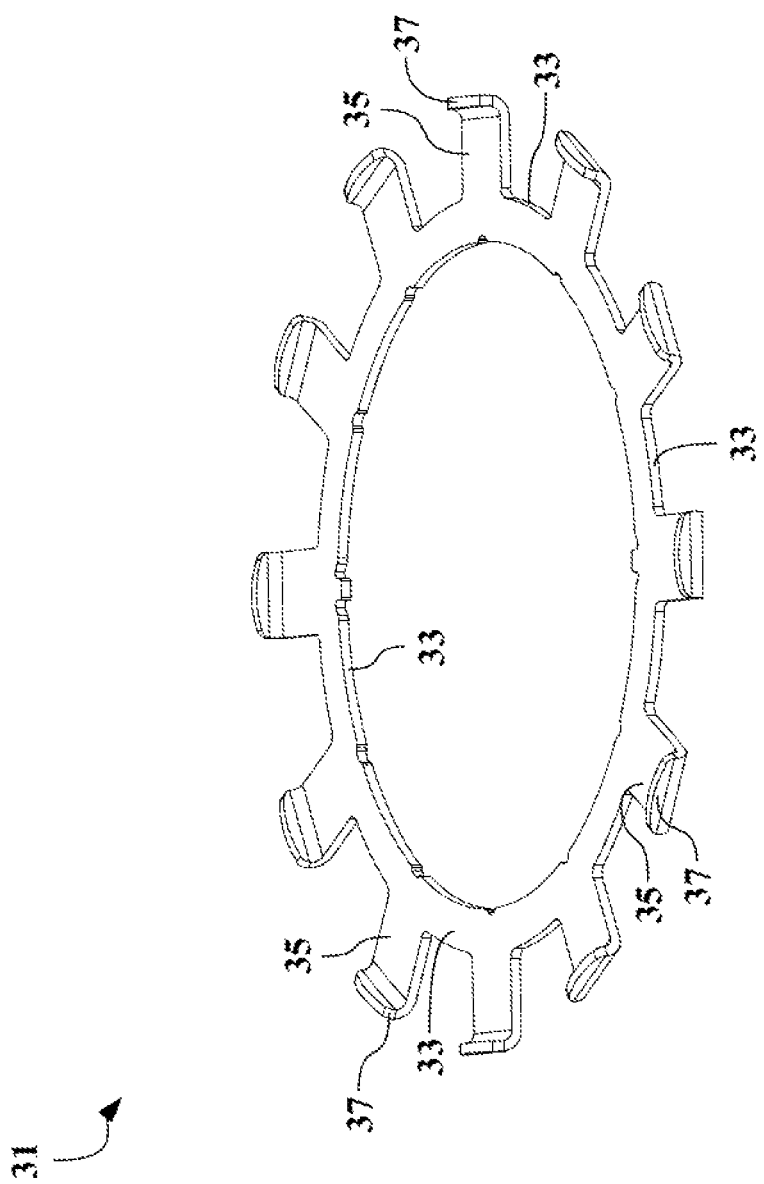
FIG. 5 is a schematic, isometric view of the second support ring of the rotor shown in FIG. 1.
Figure 6:
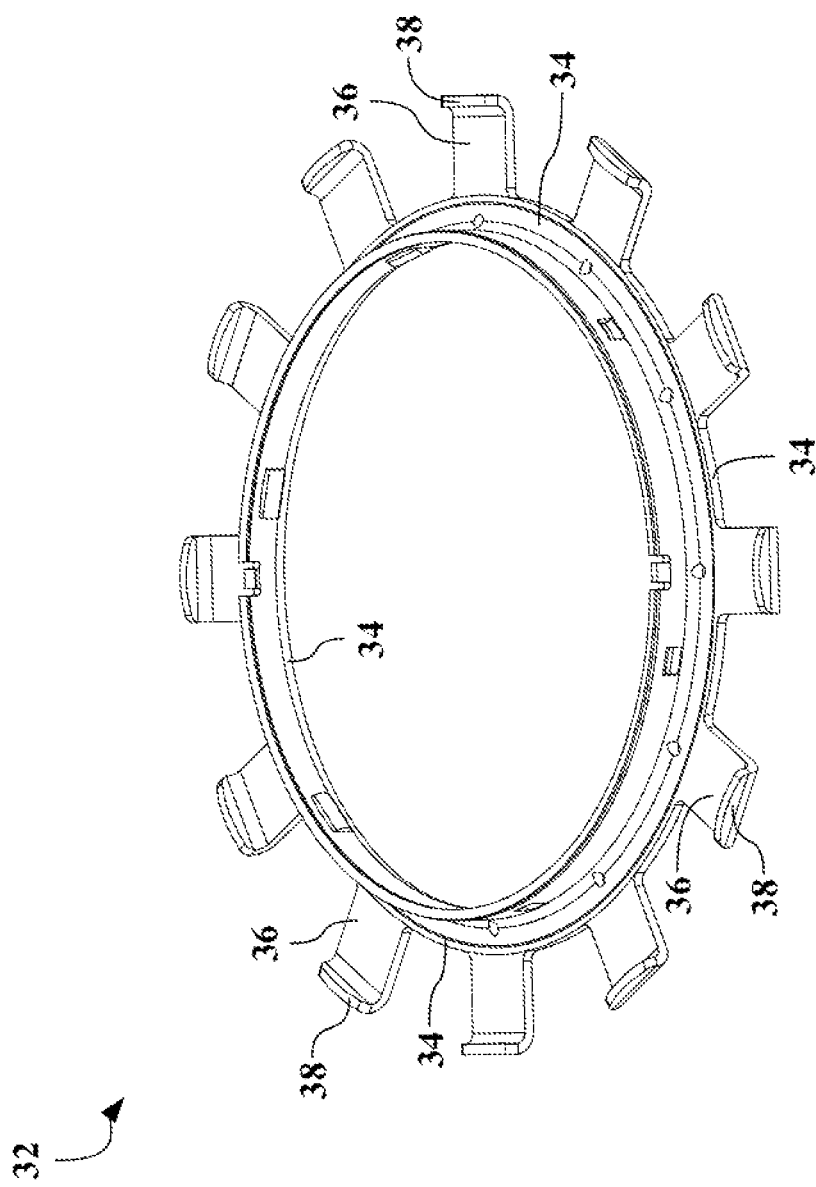
FIG. 6 is a schematic, isometric view of the first support ring of the rotor shown in FIG. 1.

Referring now to FIG. 3, FIG. 4, FIG. 5, and FIG. 6, and with continued reference to FIGS. 1-2, there are shown additional views of various components of the rotor 10 shown in FIGS. 1-2. FIG. 3 shows another isometric view of portions of the rotor 10. However, in FIG. 3 the core 14 and the windings 20 are hidden from view to better illustrate a first support ring 31 and a second support ring 32 of the rotor 10, which are described in more detail herein. FIG. 4 shows an isometric view of only the core 14. FIG. 5 shows an isometric view of the first support ring 31. FIG. 6 shows an isometric view of the second support ring 32.

As best viewed in FIG. 3, the rotor 10 also includes a plurality of bobbin segments or bobbins 22, each of which substantially surrounds one of the rotor teeth 16. The bobbins 22 may provide an insulating layer between the windings 20 and the rotor teeth 16. The bobbins 22 may also provide structural support for the windings.

As best viewed in FIG. 4, the core 14 defines a first axial side 25 and a second axial side 26 of the rotor teeth 16. Designation as first or second may occur in any order and is not limiting of any specific component. The bobbin rings 22 are between the windings 20 and the rotor teeth 16 on the first axial side 25 and the second axial side 26 of the core 14. On the side of the hub 12 adjacent to the first axial side 25 of the core 14, an annular shelf 28 extends radially outward from the hub 12.

The rotor 10 includes the first support ring 31 and the second support ring 32. As shown in FIG. 3, the first support ring 31 and the second support ring 32 are disposed on opposite sides of the core 14, axially. The first support ring 31 and the second support ring 32 are in contact with at least the hub 12, and may also be in contact with the core 14 and the bobbins 22, as shown in FIG. 2.

The first support ring 31 includes an annular base or first disc 33 and the second support ring 32 includes a second disc 34 or annular base. The first disc 33 and the second disc 34 are in contact with the hub 12 and are configured to transfer loads from the first support ring 31 and the second support ring 32 to the hub 12.

A plurality of first fingers 35 extend radially outward from the first disc 33, and a plurality of second fingers 36 extend radially outward from the second disc 34. In the configuration of the rotor 10 shown in the figures, each of the first fingers 35 corresponds to one of the windings 20 and is generally aligned with one of the rotor teeth 16. Similarly, on the opposing side of the core 14, each of the second fingers 36 corresponds to one of the windings 20. For the rotor 10, the first support ring 31 and the second support ring 32 are not identical but do share many similar features.

As best viewed in FIG. 3 and FIG. 5, a plurality of first loaded edges 37 extend axially from the first fingers 35 of the first support ring 31. The first loaded edges 37 are disposed radially outward of the windings 20, such that radial loads from the windings 20 are transferred—at least partially—to the load edges 37 of the first support ring 31. Similarly, a plurality of second loaded edges 38 extend axially from the second fingers 36 and are disposed radially outward of the windings 20, such that radial loads from the windings 20 are transferred—at least partially—to the load edges 38 of the second support ring 32.

The first loaded edges 37 and second loaded edges 38 are cantilevered from the first fingers 35 and the second fingers 36, respectively, in the configuration of the rotor 10 shown. However, other shapes may be used to allow transfer of radial loads from the windings 20 to the first support ring 31 and the second support ring 32 and, therefore, to the hub 12. For example, and without limitation, the first loaded edges 37 and second loaded edges 38 may also be formed with a rounded or hooked shape (i.e., similar to a shepherd's hook or a candy cane) extending from the first fingers 35 and the second fingers 36, respectively. Additionally, the first loaded edges 37 and second loaded edges 38 need not be identical.

Radial loads are transferred from the windings 20 to the bobbins 22. Without the first support ring 31 and the second support ring 32, all of the radial loads from the winding 20 would be transferred to the rotor teeth 16 and the core 14—possibly through the bobbins 22 as an intermediary. However, the first support ring 31 and the second support ring 32 absorb or react some of the radial loads from the windings 20. This configuration reduces and distributes the loads transferred to the bobbins 22 and the rotor teeth 16 of the core 14.

In the configuration of the rotor 10 shown, the first fingers 35 are disposed between the windings 20 and the first axial side 25 of the rotor teeth 16, and the second fingers 36 are disposed between the windings 20 and the second axial side 26 of the rotor teeth 16. Furthermore, the bobbins 22 are disposed between the windings 20 and the first and second fingers 35, 36. Therefore, radial loads from the windings 20 are transferred first to the bobbins 22 and then to the first and second fingers 35, 36.

The first support ring 31 may be formed as a unitary component, such that the first disc 33, the first fingers 35, and the first loaded edges 37 are formed as one piece. Furthermore, the first support ring 31 may be a stamped component. Similarly, the second support ring 32 may be stamped as a unitary component, such that the second disc 34, the second fingers 36, and the second loaded edges 38 are formed as a one-piece stamping.

The first support ring 31 and the second support ring 32 may be formed from substantially-nonmagnetic materials. If the first support ring 31 and the second support ring 32 are substantially nonmagnetic, the first support ring 31 and the second support ring 32 may not alter the magnetic response of the windings 20 during operation of the rotor 10 in the electric machine. The bobbins 22 may also be formed from nonmagnetic or insulating materials. For example, and without limitation, the bobbins 22 may be formed from resin and the first support ring 31 and the second support ring 32 may be formed from stainless steel.

For the rotor 10 shown, the second support ring 32 may be press-fit onto the hub 12. Therefore, the first support ring 31 is trapped between the annular shelf 28 and the first axial side 25 of the core 14. Then the second support ring 32 is press-fit onto the hub 12, such that the second support ring 32 traps the core 14 and the first support ring 31 against the annular shelf 28 of the hub 12.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A rotor, comprising:
 a hub;
 a core disposed radially outward of the hub, relative to an axis of the rotor, and having a plurality of rotor teeth extending axially outward therefrom;
 a plurality of windings wrapped around the rotor teeth;
 a first support ring, having:
  a first disc,
  a plurality of first fingers extending radially outward from the first disc, wherein each of the first fingers corresponds to one of the windings, wherein the first fingers are disposed between the windings and a first axial side of the rotor teeth, and
  a plurality of first loaded edges extending axially from the first fingers and disposed radially outward of the windings; and
 a second support ring, having:
  a second disc,
  a plurality of second fingers extending radially outward from the second disc, wherein each of the second fingers corresponds to one of the windings, wherein the second fingers are disposed between the windings and a second axial side of the rotor teeth, and
  a plurality of second loaded edges extending axially from the second fingers and disposed radially outward of the windings.

2. The rotor of claim 1, further comprising a plurality of bobbin rings, wherein each bobbin ring substantially surrounds one of the rotor teeth.

3. The rotor of claim 2, wherein the bobbin rings are disposed between the windings and the first and second fingers.

4. The rotor of claim 3, wherein the first support ring and the second support ring are substantially nonmagnetic.

5. The rotor of claim 4, further comprising an annular shelf formed on the hub,
wherein the first support ring is trapped between the annular shelf and the first axial side of the core, and
wherein the second support ring is press-fit onto the hub such that the second support ring traps the core and the first support ring against the annular shelf.

6. The rotor of claim 5,
wherein the first disc, the first fingers, and the first loaded edges of the first support ring are formed as a one-piece stamping, and
wherein the second disc, the second fingers, and the second loaded edges of the second support ring are formed as a one-piece stamping.

7. The rotor of claim 1, further comprising an annular shelf formed on the hub,
wherein the first support ring is trapped between the annular shelf and the first axial side of the core, and
wherein the second support ring is press-fit onto the hub such that the second support ring traps the core and the first support ring against the annular shelf.

8. The rotor of claim 7, further comprising a plurality of bobbin rings, wherein each bobbin ring substantially surrounds one of the rotor teeth.

9. The rotor of claim 8, wherein the bobbin rings are disposed between the windings and the first and second fingers.

10. The rotor of claim 1, wherein the first support ring and the second support ring are substantially nonmagnetic.

11. The rotor of claim 10,
wherein the first disc, the first fingers, and the first loaded edges of the first support ring are formed as a one-piece stamping, and
wherein the second disc, the second fingers, and the second loaded edges of the second support ring are formed as a one-piece stamping.

\* \* \* \* \*